(12) United States Patent
Kimura et al.

(10) Patent No.: US 7,815,760 B2
(45) Date of Patent: Oct. 19, 2010

(54) METHOD OF MANUFACTURING HERMETICALLY SEALED CONTAINER

(75) Inventors: Akihiro Kimura, Yokohama (JP); Masahiro Tagawa, Isehara (JP); Nobuhiro Ito, Yamato (JP); Takayuki Ogawara, Atsugi (JP); Tomonori Nakazawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 12/206,970

(22) Filed: Sep. 9, 2008

(65) Prior Publication Data
US 2009/0071588 A1    Mar. 19, 2009

(30) Foreign Application Priority Data
Sep. 13, 2007    (JP)    ............................. 2007-238034

(51) Int. Cl.
*B32B 37/12*    (2006.01)
(52) U.S. Cl. .......................... 156/64; 156/350; 156/358; 156/360; 156/378; 156/379; 156/580; 156/583.1; 228/103; 228/104
(58) Field of Classification Search ................... 156/64, 156/350, 358, 360, 378, 379, 580, 583.1; 228/103, 104
See application file for complete search history.

(56) References Cited

U.S. PATENT DOCUMENTS

| | | | | |
|---|---|---|---|---|
| 6,004,413 A | * | 12/1999 | Couttenier | .................... 156/99 |
| 7,039,303 B2 | | 5/2006 | Kimura et al. | ............... 392/416 |
| 7,110,665 B2 | | 9/2006 | Kamata et al. | ............... 392/420 |
| 2001/0009836 A1 | * | 7/2001 | Nakanishi et al. | .............. 445/66 |
| 2004/0000367 A1 | * | 1/2004 | McGlinchy | ................... 156/64 |
| 2006/0082298 A1 | | 4/2006 | Becken et al. | ................ 313/512 |
| 2006/0199462 A1 | * | 9/2006 | Tagawa et al. | ................. 445/24 |

FOREIGN PATENT DOCUMENTS

| | | |
|---|---|---|
| JP | 6-18829 | 1/1994 |
| JP | 10-236852 | 9/1998 |

* cited by examiner

*Primary Examiner*—Kat Wyrozebski
*Assistant Examiner*—Joshel Rivera
(74) *Attorney, Agent, or Firm*—Fitzpatrick, Cella, Harper & Scinto

(57) ABSTRACT

A method of manufacturing a hermetically sealed container including a pair of substrates disposed in opposition to each other, a frame member disposed between the pair of substrates, and a bonding member bonding the substrate to the frame member, includes a bonding step of heating the bonding member for bonding the substrate to the frame member. The bonding step includes a measuring process for measuring a height of the bonding member in a direction perpendicular to the substrate, and a heating and pressing process for partially pressing the substrate to the bonding member while partially heating the bonding member. The heating and pressing process is conducted by scanning, along the bonding member, an area of the bonding member partially heated and an area of the substrate partially pressed. During the heating and pressing process, the pressure exerted on the substrate is controlled based on the measured height of the bonding member measured such that a constant pressure is exerted between the substrate and the bonding member.

10 Claims, 4 Drawing Sheets

METHOD OF MANUFACTURING HERMETICALLY SEALED CONTAINER

BACKGROUND OF THE INVENTION

1. Field of the Invention

The present invention relates to a method of manufacturing a hermetically sealed container used for a flat panel display apparatus, a flat type illumination apparatus, and the like.

2. Description of the Related Art

As a method of manufacturing a hermetically sealed container required for hermetically maintaining an internal space, various methods have been proposed up to now by Japanese Patent Application Laid-Open No. H06-018829, Japanese Patent Application Laid-Open No. H10-236852, US Patent Publication No. 2006/0082298 and the like.

Japanese Patent Application Laid-Open No. H06-018829 discloses a laminating device for a glass substrate which is provided with a pressing unit in a movable surface plate part and is also provided with a detecting unit for detecting a gap between glass substrates in its pressing place and controls the pressure unit by the detected value. Further, Japanese Patent Application Laid-Open No. H10-236852 discloses a manufacturing device of the multiple-layered glass for detecting the thickness of a double-layered glass material and allowing a forward/backward driving device to operate such that this detected thickness and the opposed interval of a press device becomes equal. Further, US Patent Publication No. 2006/0082298 discloses a bonding method of the substrate provided with a pressure unit by magnet.

In any of the configurations disclosed in Japanese Patent Application Laid-Open No. H06-018829, Japanese Patent Application Laid-Open No. H10-236852, US Patent Publication No. 2006/0082298, there are often cases where it is difficult to have the gap between the substrate and the bonding member continuously brought into tight contact and unable to secure the hermetic sealing property, and the manufacturing method capable of securing air-tightness of the container more stably has been desired.

To describe more in detail, in the method of manufacturing the hermetically sealed container by installing a frame member between a pair of substrates and bonding between the frame member and the substrate by a bonding member, when an uneven thickness occurs in the bonding member, a gap (uneven contact) occurs between the bonding member and the substrate. This gap causes heat to be hardly transferred to the bonding member at the time of heating and melting the bonding member through the substrate so as to bond the substrate and the frame member. As a result, the molten state of the bonding member is different for each location, and the substrate and the bonding member are prevented from being uniformly contacted along the bonding member. Hence, in the heating and melting step of the bonding member, a continuously tight contact between the substrate and the bonding member is desired in order to improve hermetic sealing property of the container.

SUMMARY OF THE INVENTION

In view of the above described problem of the Related Art, an object of the present invention is to provide the method of manufacturing a hermetically sealed container improved in hermetic sealing property between the substrate and the bonding member.

The present invention provides a method of manufacturing a hermetically sealed container including a pair of substrates disposed in opposition to each other, a frame member disposed between the pair of substrates and a bonding member bonding the substrate to the frame member, and the method of manufacturing the hermetically sealed container includes a bonding step of heating the bonding member for bonding the substrate to the frame member. To achieve the object, the bonding step includes a measuring process for measuring a height of the bonding member in a direction perpendicular to the substrate and a heating and pressing process for heating and pressing the bonding member partially along an extending direction of the bonding member. In this heating and pressing process, based on the height of the bonding member at a heating position, by adjusting the pressing force applied to the bonding member, the object is achieved.

According to the present invention, a hermetically sealed container improved in hermetic sealing property between the substrates and the bonding member is obtained.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The method of manufacturing a hermetically sealed container as described below is applicable to the method of manufacturing an organic LED display, a plasma display apparatus or an electron beam display apparatus. In particular, because the organic LED display and the electron beam display apparatus require highly hermetic sealing property, this method is suitable for the method of manufacturing the hermetically sealed container constituting these apparatuses.

Figure 1:
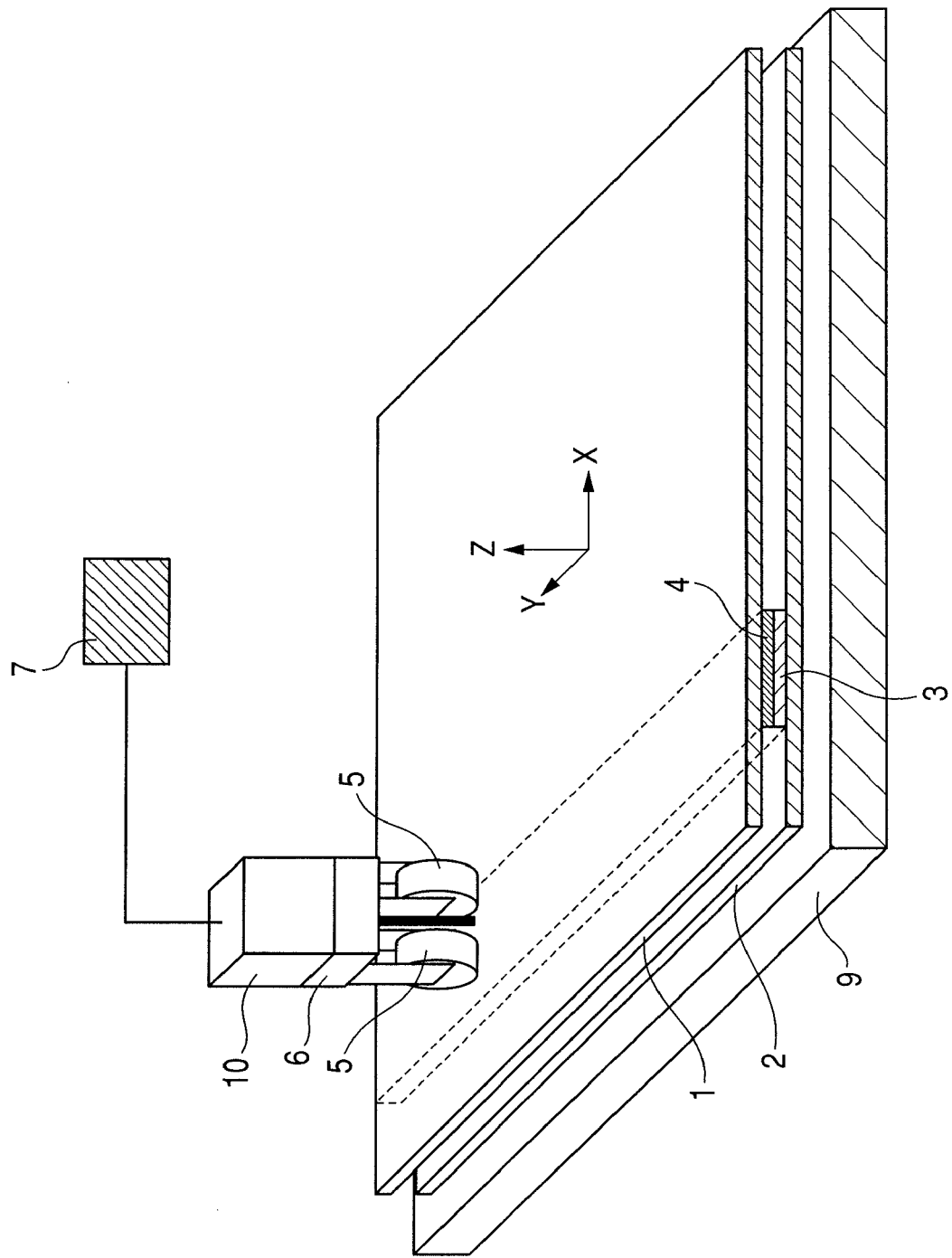
FIG. 1 is a perspective view representing the method of manufacturing a hermetically sealed container according to a first embodiment and a first example of the present invention.
Figure 2:
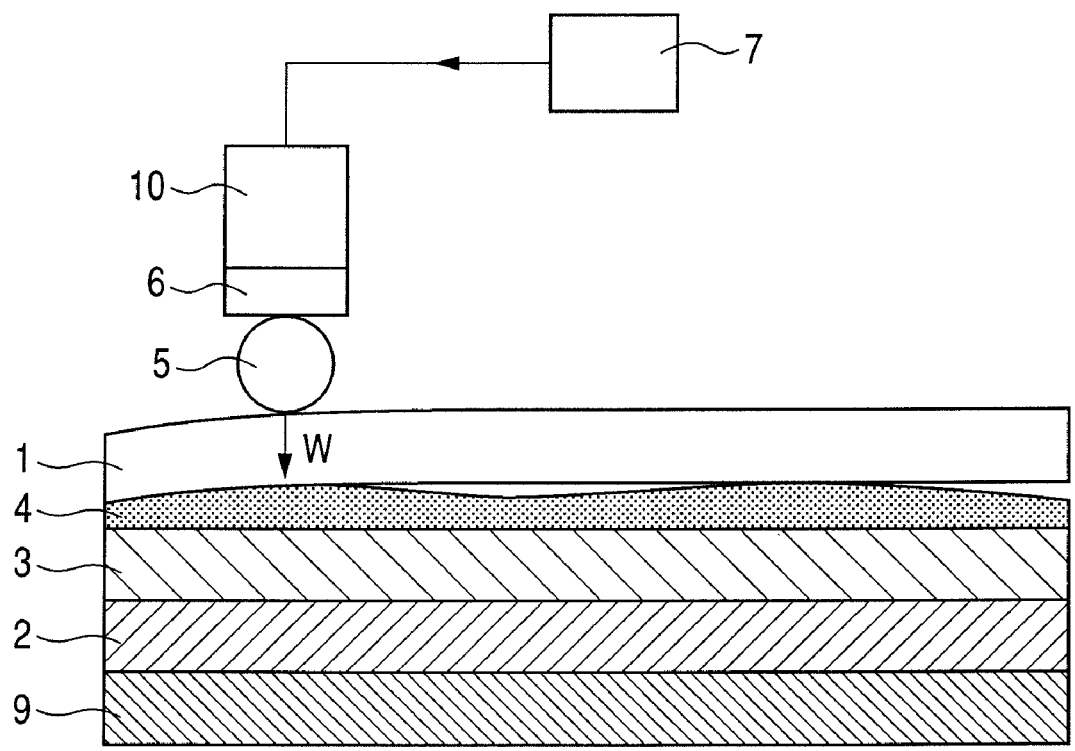
FIG. 2 is a longitudinal sectional view representing a step of the method of manufacturing a hermetically sealed container according to a first embodiment and a first example of the present invention.

Thus, with the method of manufacturing the electron beam display apparatus cited as an example, a first embodiment of the present invention will be specifically described below based on FIGS. 1 and 2. FIG. 1 is a perspective view showing the method of manufacturing the hermetically sealed container according to a first embodiment of the present invention, and illustrates a part of the hermetically sealed container in which the bonding is performed. FIG. 2 is a longitudinal section view cut along a frame member of FIG. 1.

In FIGS. 1 and 2, the hermetically sealed container to be manufactured includes a pair of substrates 1 and 2 disposed in opposition to each other, a frame member 3 disposed between the pair of substrates 1 and 2, and a bonding member 4 bonding one substrate 1 and the frame member 3. The frame member 3 maintains a gap between the pair of substrates 1 and 2, and an inter space is formed inside by the pair of substrates 1 and 2. The substrate 2 of this hermetically sealed container is supported on the upper surface of a support base 9.

Further, on the substrate 1, a rotating body 5 movable in rotation on the upper surface of the substrate 1 along the bonding member 4 is disposed. The rotating body 5 is fixed to the bottom of a heater 6, and is further fixed to a pressing cylinder 10 so as to be able to partially pressure the bonding member 4 by a pressing force W through the substrate 2. The heater 6 and the pressing cylinder 10 are connected to a control computer 7 to be controlled.

For the rotating body 5, in addition to a disc-shaped rotating body shown in FIGS. 1 and 2, the one capable of securing continuous pressing points of an endless track for the bonding member 4 extending on the frame member 3 such as a spherical rotating body is selected.

The heater 6 may be selected from a heater such as a laser apparatus capable of generating a light beam for heating the bonding member 4 and a lamp heating apparatus. Hence, the rotating body 5 adopts the disposition and the shape not to inhibit the light beam to the substrate 1 side of the heater 6.

Further, in the present embodiment, to manufacture the electron beam display apparatus, the substrate 1 is a phosphor substrate disposed with a phosphor, and the substrate 2 is an electron source substrate disposed with an electron source. Since the phosphor substrate serves as a display surface side, it includes a light-transmitting material, and hence, it is preferable in view of high transmittance of the light beam that the substrate of the side contacting the bonding member 4 is the phosphor substrate.

The material of the frame member 3 can be selected from glass, ceramics, metal, and the like. The material of the bonding member 4 can be selected from metal such as gold, silver, aluminum and indium, and glass, glass frit, and the like.

Next, the method of manufacturing the hermetically sealed container of the present embodiment will be described.

First, on the substrate 2, the frame member 3 is bonded in advance. As a bonding method, a method of baking after coating glass frit, and a method of disposing a metal and melting the metal inside a furnace, and the like can be selected.

Next, the bonding member 4 is formed on the frame member 3, and upon thereof, the substrate 1 is installed, and this combination is installed on the support base 9.

After that, by an unillustrated shape measuring device, a height for each place of the bonding member 4 is measured across the whole in the extending direction.

The height information on the measured bonding member 4 is transmitted to the control computer 7. Here, the height of the bonding member 4 designates a height in the direction perpendicular to a main surface of the substrate 1 superposed with the bonding member 4 side from the substrate 2, and is a height in the Z direction in the Figure. The extending direction of the bonding member indicates a direction parallel with a main surface of the substrate 1 or the substrate 2. The main surface of the substrate is the surfaces of the substrates 1 and 2 facing a hermetical space of the hermetically sealed container including the substrates 1 and 2, the frame member 3, and the bonding member 4, and is the substrate surface in parallel with an XY flat plane in the Figure.

The control computer 7 calculates a pressing force of the pressing cylinder 10 for pressing and deforming the substrate 1 in such a manner that a constant pressure is applied between the substrate 1 and the bonding member 4 based on the height of the bonding member 4 of the position heated by the heater 6.

The calculation of the pressing force by the control computer 7 is performed by using a heating position by the heater 6 and the height information on the bonding member 4 at three points adjacent to one another, and the distance of the three points, and the thickness and elasticity modulus of the substrate 1. Based on those items of the information, the pressing force is adjusted. In concrete, according to a manner such that the pressing force is adjusted to be larger at a portion of smaller height of the bonding member 4 rather than that at the other portion of a larger height, so as not to form a gap between the substrate and the bonding member.

Here, depending on the installing place of the rotating body 5, the pressing force of the pressing cylinder 10 may be decided by using the height information on the bonding member 4 of the front and rear and the left and right of a pressing region.

Next, the rotating body 5, the heater 6 and the pressing cylinder 10, which are integrally fixed to one another, are scanned along the bonding member 4 by an unillustrated XY driving apparatus. At the same time, by the pressing force calculated by the control computer 7, the pressing cylinder 10 is driven to press the rotating body 5 to the substrate 1 side, while being rotationally moved, thereby allowing the substrate 1 and the bonding member 4 to be continuously brought into tight contact without gap, while irradiating the light beam by the heater 6 such as the laser apparatus.

As a result, the light beam transmits the substrate 1, and heats and melts the bonding member 4, and the substrate 1 and the frame member 3 are bonded by the bonding member 4 in a uniform molten state having no unevenness for each location. At this time, the height information on the rotating body 5 is also detected by the pressing cylinder 10, and controls the pressing force of the pressing cylinder 10 to maintain the thickness (height) of the bonding member 4 constant or more so that the bonding member 4 is prevented from being molten to invite over-application of the pressure. Needless to mention, at this time, a contact state between the substrate 1 and the bonding member 4 in which no gap is present is maintained. As a result, comparing with the conventional manufacturing method, the hermetic sealing property between the substrate and the bonding member is improved. Further, according to the present embodiment, the height information on the bonding member is measured in advance, so that the measuring process of measuring the height information on the bonding member and the heating and pressing process of heating and pressing the bonding member can be made a separate process, and this can simplify the hermetically sealed container manufacturing apparatus. Further, since the rotating body 5 is used as the pressing unit, the continuous pressing points of the endless track can be secured for the bonding member 4, and the substrate 1 can be pressed without being harmed.

Figure 3:
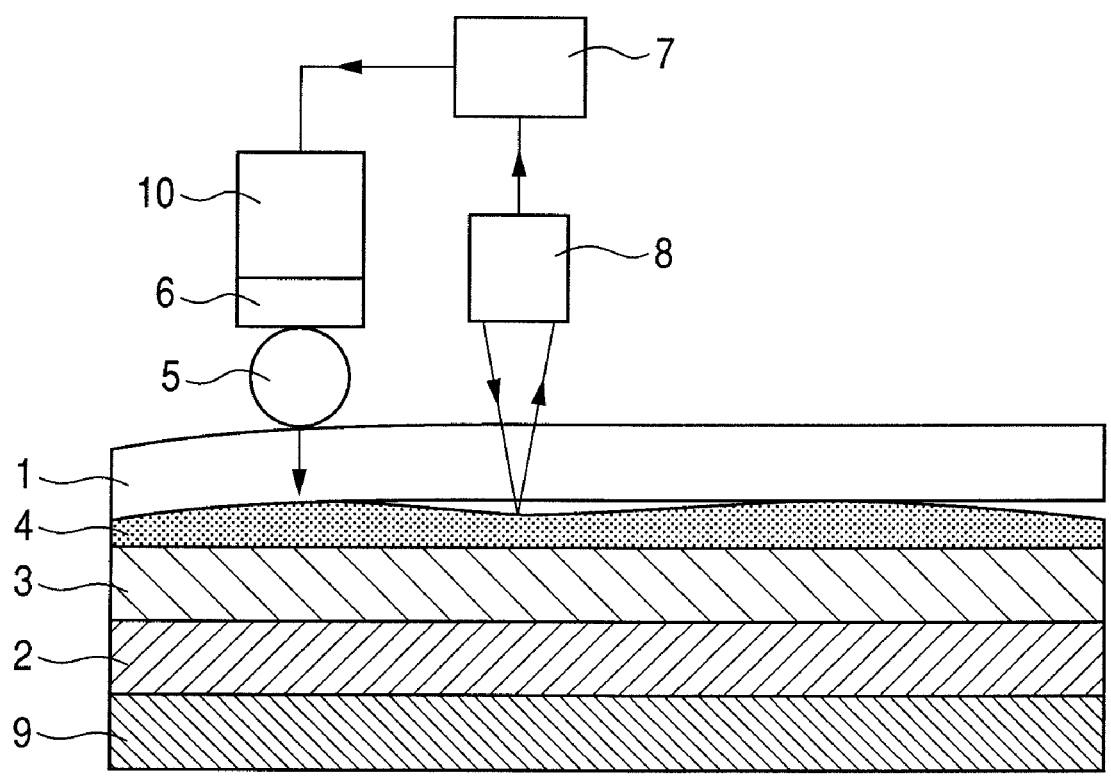
FIG. 3 is a longitudinal sectional view representing a step of the method of manufacturing a hermetically sealed container according to a second embodiment and a second example of the present invention.

Next, a second embodiment of the present invention will be described specifically referring to FIG. 3. FIG. 3 is a perspective view illustrating the method of manufacturing a hermetically sealed container according to a second embodiment of the present invention, and is a longitudinal sectional view cut along a frame member.

The present embodiment as shown in FIG. 3 further adds a shape measuring device 8 to the configuration of the hermetically sealed container manufacturing apparatus of the first embodiment. The shape measuring device 8 is located ahead of the rotational movement direction of a rotating body 5 relative to the rotating body 5, and measures in advance a difference of the height by the location of the bonding member 4.

Further, the method of manufacturing the hermetically sealed container of the second embodiment will be described.

First, a frame member 3 is bonded in advance on the substrate 2. As a bonding method, a method of baking after coating a glass frit, a method of disposing a metal and melting the metal inside a furnace, and the like can be selected.

A bonding member 4 is formed on the frame member 3, and thereon, a substrate 1 is installed, and this combination is installed on a support base 9. The materials of the substrates 1 and 2, the frame member 3, and the bonding member 4 can be selected from the same materials as the first embodiment.

Next, the rotating body 5, the heater 6, the pressing cylinder 10, and the shape measuring device 8, which are integrally fixed to one another, are scanned along the bonding member 4 by an unillustrated XY driving apparatus, and at the same time, measures a difference of the height by the location of the bonding member 4 by the shape measuring device 8. At this time, based on the height of the bonding member 4 of the position heated by the heater 6, a control computer 7 calculates a pressing force of the pressing cylinder 10 capable of pressing and deforming the substrate 1 in such a manner that a constant pressure is applied between the substrate 1 and the bonding member 4 based on the height of the bonding member 4 of the position heated by the heater 6, and controls the pressing force of the pressing cylinder 10 for each location.

Here, depending on the disposing place of the rotating body 5, by using not only the pressing region by the rotating body 5 but also the height information on the bonding member 4 of the front and rear and the left and right of a pressing region, the pressing force of the pressing cylinder 10 may be decided. The height of the bonding member 4 designates a height in the direction perpendicular to the substrate 1 superposed with the bonding member 4 side from the substrate 2.

The pressing cylinder 10 is driven by the pressing force calculated by the control computer 7, and the rotating body 5 is pressed to the substrate 1 side, while being rotationally driven, so that the substrate 1 and the bonding member 4 are continuously brought into tight contact without gap, thereby to irradiate the light beam by the heater 6 such as the laser device.

As a result, the light beam transmits the substrate 1, and heats and melts the bonding member 4, and the substrate 1 and the frame member 3 are bonded by the bonding member 4 in a uniform molten state having no unevenness for each location. At this time, the height information on the rotating body 5 is also detected by the pressing cylinder 10, and controls the pressing force of the pressing cylinder 10 to maintain the thickness (height) of the bonding member 4 constant or more so that the bonding member 4 is prevented from being molten to invite over-application of the pressure. Needless to mention, at this time, a contact state between the substrate 1 and the bonding member 4 in which no gap is present is maintained. As a result, comparing with the conventional manufacturing method, the hermetic sealing property between the substrate and the bonding member is improved. Further, according to the present embodiment, since the height information on the bonding member is measured in the heating and pressing process for heating and pressing the bonding member, a total time required for the hermetically sealed container manufacturing step can be shortened.

EXAMPLES

The present invention will be further described below in detail with specific examples cited.

First Example

The present example is an example of the method of manufacturing the electron beam display apparatus shown in FIGS. 1 and 2.

First, as a substrate 2, an electron source substrate formed with an electron source on the surface of a glass substrate is prepared, and glass frit is coated on the electron source substrate, and thereon, as a frame member 3, an upper peeping square-shaped glass is installed and bonded by baking. Such substrate 2 as the electron source substrate is installed on a support base 9, and is positioned at the predetermined position by an unillustrated positioning mechanism, and after that, is fixed to the support base 9 by a vacuum chuck.

Further, on the frame member 3 including the upper peeping square-shaped glass, aluminum is installed as the bonding member 4.

Next, a difference of the height at each location of aluminum serving as the bonding member 4 is measured across the whole circumference of the frame member 3 by an unillustrated laser displacement meter, and a value (height of aluminum) in the Z direction in the Figure for the coordinate XY of the electron source substrate is obtained. Here, the height of aluminum indicates a height in the Z direction perpendicular to the electron source substrate superposed with aluminum side from the electron source substrate.

This value is transmitted to the control computer 7. The control computer 7 calculates a pressing force of the pressing cylinder 10 capable of pressing the substrate 1 to apply a desired pressure to be described later between the substrate 1 and aluminum based on the height of the heating region of aluminum and the height in front and rear thereof, and determines a pressing force for the coordinate XY.

Here, the calculation of the pressing force is decided based on the method of the first embodiment.

Next, as the substrate 1, a phosphor substrate formed with phosphor on the surface of the glass substrate is prepared. By an unillustrated alignment device, the phosphor substrate and the electron source substrate are positioned with a predetermined accuracy, and the phosphor substrate serving as the substrate 1 is installed on aluminum.

Next, two rollers as rotating bodies 5 are installed on both sides of the bonding region of the phosphor substrate. Here, on this roller, a semiconductor laser as a heater 6 is installed and fixed, and further, the pressing cylinder 10 is fixed.

Next, the roller, the semiconductor laser and the pressing cylinder 10, which are integrally fixed, are scanned along the bonding region of the phosphor substrate by an unillustrated XY driving device. At the same time, the pressing cylinder 10 is driven by the pressing force calculated by the control computer 7, and the roller is pressed to the phosphor substrate side, while being rotationally driven, so that the laser light of the semiconductor laser is irradiated.

As a result, while the phosphor substrate and aluminum are continuously brought into tight contact with each other without a gap, the light beam transmits the phosphor substrates, heats and melts aluminum, and the phosphor substrate and the glass of the frame member 3 are bonded by aluminum in a uniform molten state having no unevenness for each location. As a result, the electron beam display apparatus including the hermetically sealed container as shown partially in FIG. 1 is manufactured. In the case of this hermetically sealed container, since aluminum serving as the bonding member as described above is in a uniform molten state having no unevenness for each location, the hermetic sealing property of the container is further improved over the conventional manufacturing method.

In the above described manufacturing step, the height information on the roller is also detected by the pressing cylinder 10, and the pressing force of the pressing cylinder 10 may be controlled to maintain the thickness (height) of aluminum constant or more so that aluminum is prevented from being molten to invite over-application of the pressure. Needless to mention, at this time, a contact state between the phosphor substrate and aluminum in which no gap is present is maintained.

Second Example

The present example is an example of the method of manufacturing the electron beam display apparatus shown in FIG. 3.

The present example has the same configuration as the first example except that a shape measuring device 3 is provided. A roller, a semiconductor laser, a pressing cylinder 10, and a laser displacement meter as the shape measuring device 3 all of which are integrally fixed together, are scanned along a bonding region of a phosphor substrate by an unillustrated XY driving device. At the same time, a height shape of aluminum is measured by the laser displacement meter, and by the pressing force calculated by a control computer 7 based on the measured value, the pressing cylinder 10 is driven to press a roller, while irradiating the laser light of a semiconductor laser.

Here, the calculation of the pressing force is decided based on the method of the first embodiment.

As a result, while the phosphor substrate and aluminum are continuously brought into tight contact with each other without gap, the laser beam transmits the phosphor substrates, heats and melts aluminum, and the phosphor substrate and the glass of the frame member 3 are bonded by aluminum in a uniform molten state having no unevenness for each location.

In the present manufacturing method also, the height information on the roller is detected by the pressing cylinder 10, and the pressing force of the pressing cylinder 10 is preferably controlled to maintain the thickness of aluminum constant or more so that aluminum is prevented from being molten to invite over-application of the pressure.

The method of manufacturing the electron beam display apparatus of the present example, similarly to the first example, can bring the phosphor substrate and aluminum into tight contact with each other without gap even when the difference in height by the location of aluminum is present. As a result, the molten state of aluminum is put into a uniform molten state having no unevenness for each location, so that the hermetic sealing property of the phosphor substrate and aluminum can be improved. Further, since the process of measuring the height information on aluminum can be executed in the process of heating and pressing aluminum, a total time required for the hermetically sealed container manufacturing step can be shortened.

Third Example

Figure 4:
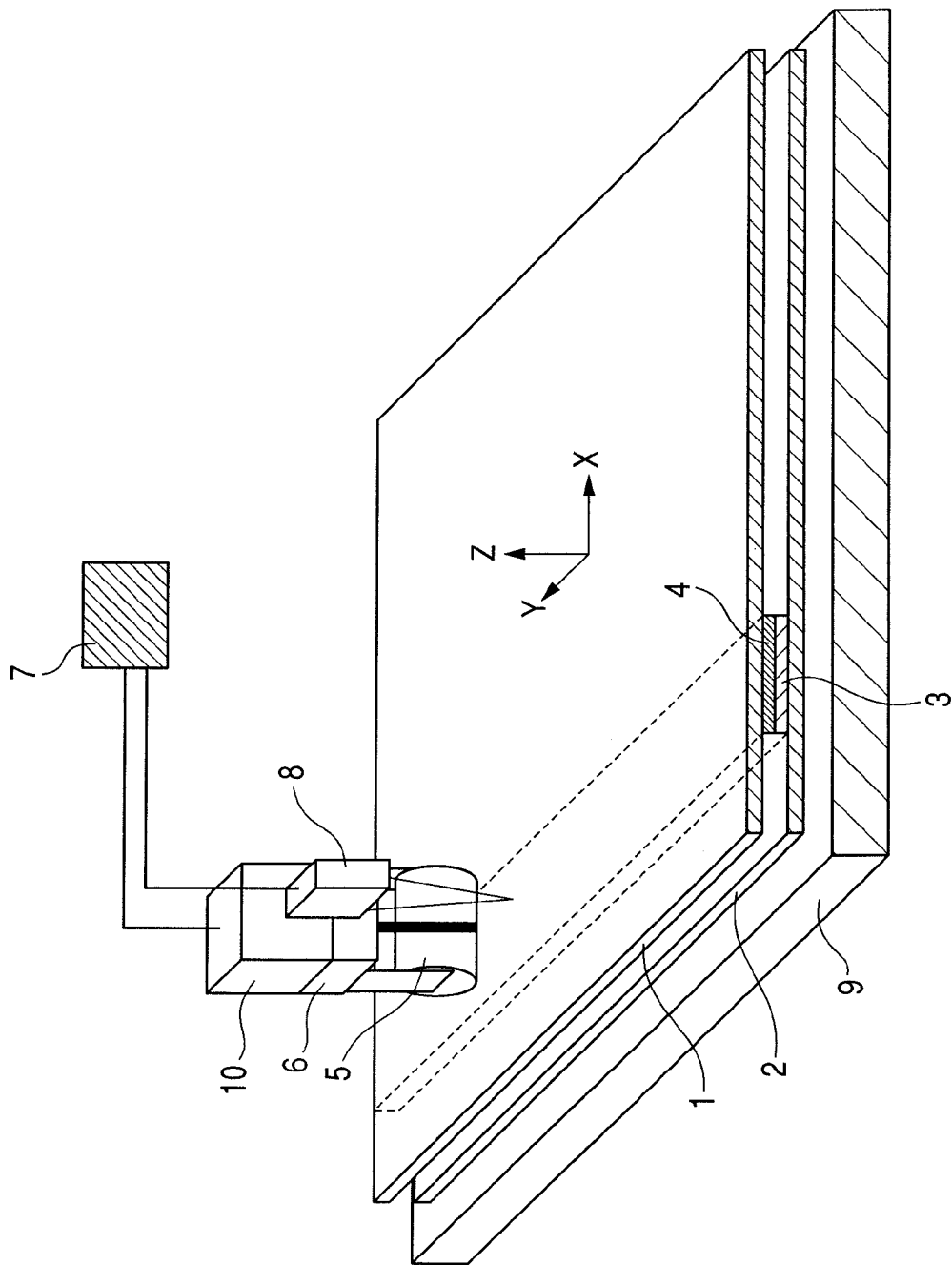
FIG. 4 is a perspective view representing the method of manufacturing an electron beam display apparatus as the hermetically sealed container according to the examples of the present invention.

The present example is an example of the method of manufacturing an electron beam display apparatus shown in FIG. 4. FIG. 4 is a perspective view illustrating the method of manufacturing the electron display apparatus as a hermetically sealed container according to the third example of the present invention, and illustrates a part of the hermetically sealed container for performing bonding.

In the present example, a rotating body 5 is a roller including a transparent glass, and the method of manufacturing the electron beam display apparatus is the same as that of the second example except that the laser light by a semiconductor laser transmits a roller and melts aluminum of a bonding member 4.

Here, the roller being a transparent substance eliminates the necessity for the roller to avoid a heating region, and similarly to the first example, an effect of relaxing the restriction of the upper limit of the pressing force by a tensile stress generated at the midpoint of the roller located at both sides of the heating region can be expected.

The method of manufacturing the electron beam display apparatus of the present example, similarly to the second example, can continuously bring the phosphor substrate and aluminum into tight contact with each other without gap even when the difference of the height by the location of aluminum is present. As a result, the molten state of aluminum is put into a uniform molten state having no unevenness for each location, and therefore, the hermetic sealing property between the phosphor substrate and aluminum can be improved. Further, the laser beam transmits the roller and melts the bonding member 4, so that the heating region can be directly heated to enable sufficient pressing force to be obtained, and therefore, the contact and the hermetic sealing property between the phosphor substrate and aluminum can be further improved over the example 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-238034, filed Sep. 13, 2007, which is hereby incorporated by reference herein in its entirety.

What is claimed is:

1. A method of manufacturing a hermetically sealed container comprising a pair of substrates disposed in opposition to each other, a frame member disposed between the pair of substrates, and a bonding member bonding the substrate to the frame member, the method comprising:
   a bonding step of heating the bonding member for bonding the substrate to the frame member,
   wherein the bonding step comprises:
   a measuring process for measuring a height of the bonding member in a direction perpendicular to the substrate; and
   a heating and pressing process for partially pressing the substrate to the bonding member while partially heating the bonding member, wherein
   the heating and pressing process is conducted by scanning, along the bonding member, an area of the bonding member partially heated and an area of the substrate partially pressed, and wherein,
   during the heating and pressing process, the pressure exerted on the substrate is controlled based on the height of the bonding member measured in the measuring step, such that a constant pressure is exerted between the substrate and the bonding member.

2. The method according to claim 1, wherein the measuring process for measuring the height of the bonding member is conducted simultaneously with the heating and pressing process for heating and pressing the bonding member.

3. The method according to claim 1, wherein the heating and pressing process is conducted using a rotating body rolling on the substrate to press the substrate, and a heater for heating the bonding member through the substrate, such that heating and pressing of the bonding member is performed by scanning with the rotating body and the heater partially along the bonding member.

4. The method according to claim 3, wherein the rotating body is transparent.

5. The method according to claim 1, wherein, in the heating and pressing process, at a smaller height portion of the bonding member, a pressing force against the bonding member is adjusted to be stronger.

6. A method of bonding a hermetically sealed container comprising a pair of substrates disposed in opposition to each other, a frame member disposed between the pair of substrates, and a bonding member bonding the substrate through the frame member, the method comprising:

measuring a height of the bonding member in a direction perpendicular to the substrate;

partially pressing the substrate to the bonding member while partially heating the bonding member by scanning, along the bonding member, an area of the bonding member partially heated in an area of the substrate partially pressed; and controlling a pressure exerted on the substrate based on the measured height of the bonding member such that a constant pressure is exerted between the substrate and bonding member.

7. The method according to claim 6, wherein measuring the height of the bonding member is conducted simultaneously with heating and pressing the bonding member.

8. The method according to claim 6, wherein the heating and pressing is conducted using a rotating body rolling on the substrate to press the substrate, and a heater for heating the bonding member through the substrate, such that heating and pressing of the bonding member is performed by scanning with the rotating body and the heater partially along the bonding member.

9. The method according to claim 8, wherein the rotating body is transparent.

10. The method according to claim 6, wherein, in heating and pressing at a smaller height portion of the bonding member, a pressing force against the bonding member is adjusted to be stronger.

\* \* \* \* \*